(12) United States Patent
Momose

(10) Patent No.: US 11,897,442 B2
(45) Date of Patent: Feb. 13, 2024

(54) BRAKE CONTROLLER AND METHOD FOR CONTROLLING BRAKE

(71) Applicant: TOYOTA JIDOSHA KABUSHIKI KAISHA, Toyota (JP)

(72) Inventor: Hirofumi Momose, Numazu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 518 days.

(21) Appl. No.: 17/319,642

(22) Filed: May 13, 2021

(65) Prior Publication Data
US 2021/0370896 A1 Dec. 2, 2021

(30) Foreign Application Priority Data

Jun. 1, 2020 (JP) .................................. 2020-095504

(51) Int. Cl.
*B60T 13/00* (2006.01)
*B60T 8/173* (2006.01)
*B60T 8/172* (2006.01)
*B60T 13/74* (2006.01)

(52) U.S. Cl.
CPC .............. *B60T 8/173* (2013.01); *B60T 8/172* (2013.01); *B60T 13/741* (2013.01)

(58) Field of Classification Search
CPC .......... B60T 8/172; B60T 8/173; B60T 13/741
See application file for complete search history.

(56) References Cited

U.S. PATENT DOCUMENTS

| 4,468,740 A * | 8/1984 | Beck ...................... B60T 8/173 303/122.07 |
| 5,931,252 A | 8/1999 | Shimizu et al. |
| 2005/0040700 A1* | 2/2005 | Yokoyama ............ B60T 13/741 303/20 |

(Continued)

FOREIGN PATENT DOCUMENTS

| JP | 10-278825 A | 10/1998 |
| JP | 2000-203402 A | 7/2000 |
| WO | 2017/169069 A1 | 10/2017 |

OTHER PUBLICATIONS

Machine translation of JP 2000-203402 (no date).*

*Primary Examiner* — Nicholas J Lane
(74) *Attorney, Agent, or Firm* — Sughrue Mion, PLLC

(57) ABSTRACT

A brake controller includes a control circuit that calculates target braking force every predetermined period, in accordance with feedback control on at least acceleration or speed of a vehicle steered for parking; and a filter circuit that outputs, to a brake device, output braking force obtained by applying a low-pass filter having a predetermined time constant to the target braking force when the amount of change in the target braking force over time is within a predetermined tolerable range. When the amount of change is outside the tolerable range, the filter circuit outputs, to the brake device, the target braking force as output braking force or outputs thereto output braking force calculated by correcting smoothed target braking force, which is obtained by applying the low-pass filter to the target braking force, so that a difference between the smoothed target braking force and the target braking force is within the tolerable range.

5 Claims, 6 Drawing Sheets

(56) References Cited

U.S. PATENT DOCUMENTS

| | | | |
|---|---|---|---|
| 2008/0051962 A1* | 2/2008 | Nakai | B60T 8/172 |
| | | | 701/70 |
| 2016/0304068 A1* | 10/2016 | Monzaki | B60T 8/171 |
| 2018/0154873 A1* | 6/2018 | Masuda | F16D 66/00 |
| 2021/0179112 A1 | 6/2021 | Tanimichi | |

* cited by examiner

BRAKE CONTROLLER AND METHOD FOR CONTROLLING BRAKE

FIELD

The present invention relates to a brake controller and a method for controlling a brake of a vehicle.

BACKGROUND

To perform automatic parking control of a vehicle, a technique has been proposed to maintain the amount of depression of a brake pedal appropriately (e.g., see Japanese Unexamined Patent Publication No. 10-278825).

For example, when a driver depressing a brake pedal causes a vehicle to creep to perform automatic parking, an automatic steering system described in Japanese Unexamined Patent Publication No. 10-278825 calculates a deviation between a detected actual amount of depression of the brake pedal and a predetermined reference amount. When this deviation exceeds a predetermined value, the automatic steering system warns the driver to regulate the actual amount of depression of the brake pedal.

SUMMARY

Since the above-described technique requires a driver to operate a brake pedal to control braking force of a vehicle, shaking of the vehicle caused by inappropriate control of braking force may be transmitted to an occupant of the vehicle in some cases, making the occupant uncomfortable. It is therefore desirable to control a brake so as not to make an occupant of a vehicle uncomfortable when the vehicle is steered for parking.

It is an object of the present invention to provide a brake controller that controls a brake device of a vehicle so as not to make an occupant thereof uncomfortable when the vehicle is steered for parking.

According to an aspect of the present invention, a brake controller for controlling a brake device of a vehicle is provided. The brake controller includes a control circuit that calculates target braking force every predetermined period, in accordance with feedback control on at least acceleration or speed of the vehicle steered for parking; and a filter circuit that outputs, when the amount of change in the target braking force over time is within a predetermined tolerable range, output braking force to the brake device, the output braking force being obtained by applying a low-pass filter having a predetermined time constant to the target braking force. When the amount of change is outside the predetermined tolerable range, the filter circuit outputs, without applying the low-pass filter to the target braking force, the target braking force to the brake device as the output braking force or outputs, to the brake device, the output braking force calculated by correcting smoothed target braking force so that a difference between the smoothed target braking force and the target braking force is within the predetermined tolerable range, the smoothed target braking force being obtained by applying the low-pass filter to the target braking force.

The filter circuit of the brake controller preferably includes a tolerable-range setting circuit that sets, every time the target braking force is inputted, an upper limit and a lower limit of the tolerable range so as to include the inputted target braking force therein; a smoothing circuit that applies the low-pass filter to the inputted target braking force to output the smoothed target braking force; and a clipping circuit that outputs, to the brake device as the output braking force, the smoothed target braking force when the smoothed target braking force is within the tolerable range, the upper limit when the smoothed target braking force is greater than the upper limit of the tolerable range, and the lower limit when the smoothed target braking force is less than the lower limit of the tolerable range.

In this case, it is preferable that the greater the inputted target braking force, the more the tolerable-range setting circuit widens the tolerable range.

Alternatively, the filter circuit of the brake controller preferably includes a smoothing circuit that applies the low-pass filter to the target braking force inputted into the filter circuit to output the smoothed target braking force; a switch for outputting the smoothed target braking force or the target braking force to the brake device as the output braking force; and a determining circuit that calculates, as the amount of change, a difference between the inputted target braking force and target braking force inputted immediately previous thereto and causes the switch to output, to the brake device as the output braking force, the smoothed target braking force when the amount of change is within the predetermined tolerable range and the target braking force when the amount of change is outside the predetermined tolerable range.

According to another aspect of the present invention, a method for controlling a brake device of a vehicle is provided. The method includes: calculating target braking force every predetermined period, in accordance with feedback control on at least acceleration or speed of the vehicle steered for parking; when the amount of change in the target braking force over time is within a predetermined tolerable range, outputting output braking force to the brake device, the output braking force being obtained by applying a low-pass filter having a predetermined time constant to the target braking force; and when the amount of change is outside the predetermined tolerable range, outputting, without applying the low-pass filter to the target braking force, the target braking force to the brake device as the output braking force or outputting, to the brake device, the output braking force calculated by correcting smoothed target braking force so that a difference between the smoothed target braking force and the target braking force is within the predetermined tolerable range, the smoothed target braking force being obtained by applying the low-pass filter to the target braking force.

The brake controller according to the present invention has an advantageous effect of being able to control a brake device of a vehicle so as not to make an occupant thereof uncomfortable when the vehicle is steered for parking.

DESCRIPTION OF EMBODIMENTS

Hereinafter, a brake controller for controlling a brake device of a vehicle and processing for brake control performed by the brake controller will be described with reference to the accompanying drawings. The brake controller performs feedback control on the acceleration (deceleration) of a vehicle steered for parking, and thereby determines target braking force required of a brake device (hereafter "target braking force"). When the amount of change in the target braking force over time (hereafter simply "the amount of change") is within a predetermined tolerable range, the brake controller outputs, to the brake device, required braking force obtained by making the target braking force smoother than when the amount of change in the target braking force is outside the tolerable range. More specifically, when the amount of change in the target braking force is within the predetermined tolerable range, the brake controller applies a low-pass filter to the target braking force; when the amount of change in the target braking force is outside the tolerable range, the brake controller does not substantially apply the low-pass filter. In this way, the brake controller switches between application and non-application of the low-pass filter, depending on the amount of change in the target braking force. Thus, when the amount of change in the target braking force is relatively large, the brake controller prevents changes in braking force actually generated by the brake device from being delayed relative to changes in the target braking force. When the amount of change in the target braking force is relatively small, the brake controller smoothes changes in braking force actually generated by the brake device so as not to make the driver uncomfortable. In particular, the fact that the brake controller applies the low-pass filter only when the amount of change in the target braking force is relatively small allows the time constant of the low-pass filter to be large. As a result, the brake controller can prevent rapid changes in braking force and self-induced vibrations thereof caused by overshoot or undershoot in the response of oil pressure of the brake device to minute changes in the target braking force.

Figure 1:
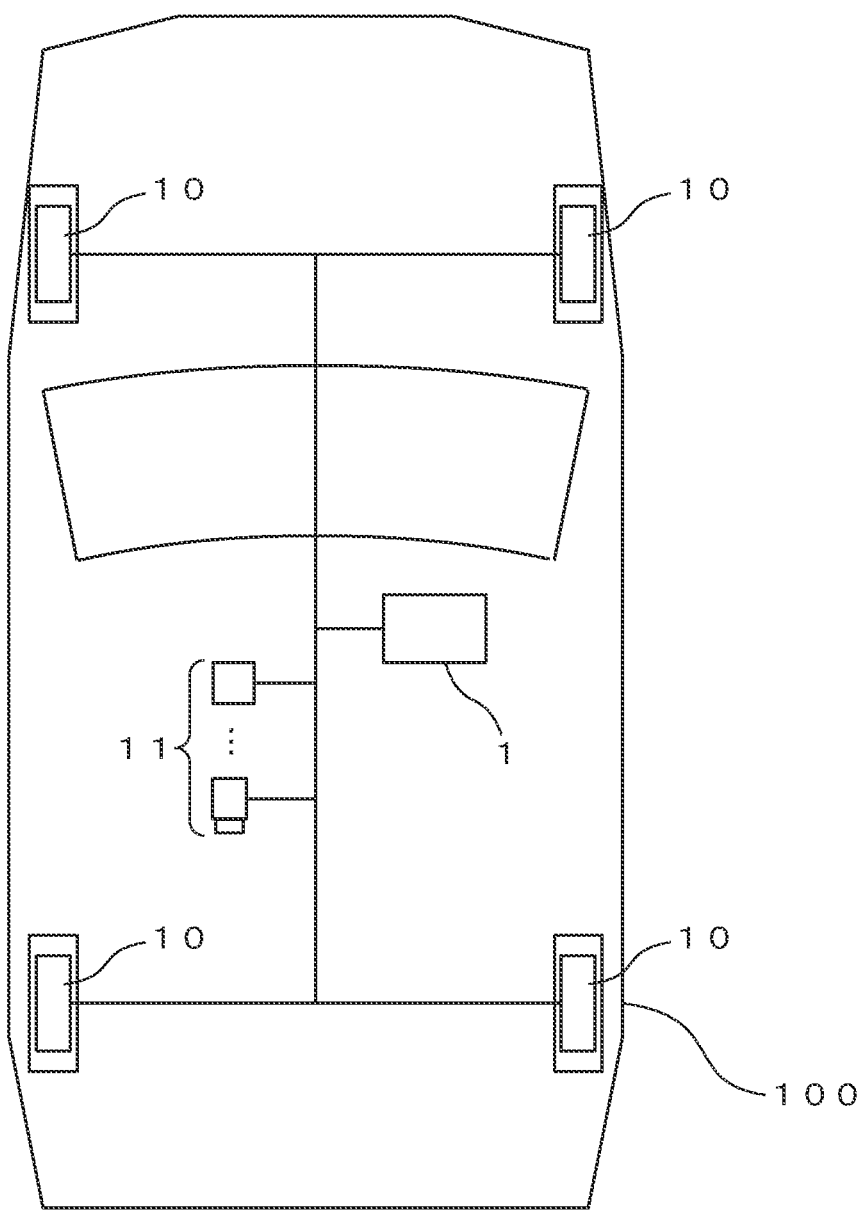
FIG. 1 schematically illustrates the configuration of a vehicle including an electronic control unit that is an embodiment of the brake controller.
Figure 2:
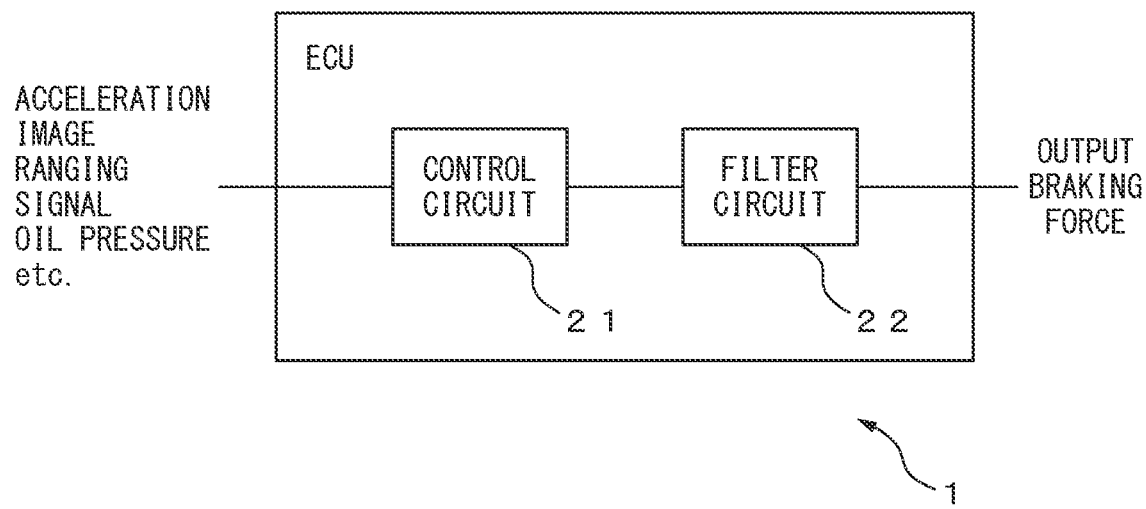
FIG. 2 schematically illustrates the configuration of the electronic control unit, which is an embodiment of the brake controller.

FIG. 1 schematically illustrates the configuration of a vehicle including an electronic control unit that is an embodiment of the brake controller. FIG. 2 schematically illustrates the configuration of the electronic control unit, which is an embodiment of the brake controller. As illustrated in FIG. 1, the vehicle 100 includes an electronic control unit (ECU) 1, which is an embodiment of the brake controller; brakes 10, each of which is an example of the brake device; and at least one sensor 11. The at least one sensor 11 includes, for example, a camera provided to capture the surroundings of the vehicle 100, a distance sensor for measuring the distance to an object near the vehicle 100, a vehicle speed sensor for measuring the speed of the vehicle 100, an acceleration sensor for measuring the acceleration of the vehicle 100, and a brake oil pressure sensor for measuring the oil pressure of the brakes 10. The distance sensor includes, for example, at least one of the following: LiDAR, radar, and clearance sonar. Sensor signals include an image generated by the camera and representing the surroundings of the vehicle 100, a ranging signal generated by the distance sensor, a vehicle speed signal measured by the vehicle speed sensor and indicating the speed of the vehicle, an acceleration signal measured by the acceleration sensor and indicating acceleration, and an oil pressure signal measured by the brake oil pressure sensor and indicating the oil pressure of the brakes.

As illustrated in FIG. 2, the electronic control unit (ECU) 1 includes a control circuit 21 and a filter circuit 22. The control circuit 21 and the filter circuit 22 may be a single integrated circuit or separate circuits. When receiving an operation signal indicating application of an automatic parking mode, in which the vehicle 100 is automatically parked, from a mode selector switch (not illustrated) disposed in the interior of the vehicle 100 for switching between application and non-application of the automatic parking mode, the ECU 1 controls, for example, the braking force of the brakes 10 and the amount of steering of the vehicle 100 so as to automatically park the vehicle 100.

The control circuit 21, which is an example of a control unit, includes, for example, one or more processors, a volatile semiconductor memory, and a nonvolatile semiconductor memory. The control circuit 21 determines a trajectory, which is a planned course along which the vehicle 100 moves to be automatically parked, and the speed, the acceleration, and the amount of steering of the vehicle 100 at every position on the trajectory, based on sensor signals that are obtained by the one or more sensors 11 mounted on the vehicle 100 and indicate the motion of the vehicle 100 or the environment around the vehicle 100.

For example, after receiving an operation signal indicating application of the automatic parking mode from the mode selector switch, the control circuit 21 inputs, every time an image is obtained from the camera, the image into a classifier that has been trained to detect, for example, division lines of a parking space and a vehicle, thereby detecting such division lines and a vehicle represented in the image. As such a classifier, the control circuit 21 may use, for example, a "deep neural network" having a convolutional neural network architecture. Alternatively, the control circuit 21 may detect division lines of a parking space and a vehicle from each image in accordance with another technique to detect such division lines and a vehicle. The control circuit 21 determines a trajectory such that the vehicle 100 stops in a parking space indicated by division lines. To this end, the control circuit 21 determines the trajectory, based on the position of a vehicle in each image and on a ranging signal obtained by the distance sensor, so that the vehicle 100 will not collide with an object near the vehicle 100. The control circuit 21 then determines a target amount of steering of the vehicle 100 and target acceleration (deceleration) of the vehicle 100 (hereafter simply "target acceleration") every predetermined period so that the vehicle 100 will move along the trajectory. A speed of several kilometers per hour is enough to park the vehicle 100, and in this case the vehicle 100 is driven by creep torque. Therefore the control circuit 21 controls the braking force of the brakes 10 so that the actual acceleration (deceleration) of the vehicle 100 (hereafter simply "actual acceleration") may approach the target acceleration. For example, the control circuit 21 calculates and determines target braking force required of the brakes 10 (e.g., oil pressure of the brakes corresponding to the target braking force) every predetermined period, based on the target acceleration and the actual acceleration of the vehicle 100 measured by the acceleration sensor, using feedback control, such as proportional control, PI control, or PID control, so that the difference between the target acceleration and the actual acceleration may decrease. Every time determining the target braking force, the control circuit 21 outputs the target braking force to the filter circuit 22. Instead of or together with acceleration, the control circuit 21 may use the speed of the vehicle 100 to perform feedback control like that described above so that the difference between a target vehicle speed and the actual speed of the vehicle 100 may decrease, thereby calculating the target braking force. In this case, the control circuit 21 may obtain a measured value of the actual speed of the vehicle 100 from a vehicle speed sensor (not illustrated) mounted on the vehicle 100.

The filter circuit 22, which is an example of a filter unit, applies a low-pass filter having a predetermined time constant to the target braking force when the amount of change in the target braking force inputted from the control circuit 21 is within a predetermined tolerable range. When the amount of change in the target braking force is outside the predetermined tolerable range, the filter circuit 22 applies the low-pass filter to the target braking force to calculate smoothed required braking force, and corrects the smoothed required braking force so that the difference between the smoothed required braking force and the original target braking force is within the predetermined tolerable range. In other words, the filter circuit 22 outputs, to the brakes 10, required braking force obtained by making the target braking force smoother than when the amount of change in the target braking force is outside the tolerable range. The required braking force outputted from the filter circuit 22 will be referred to as "output braking force" below.

Figure 3:
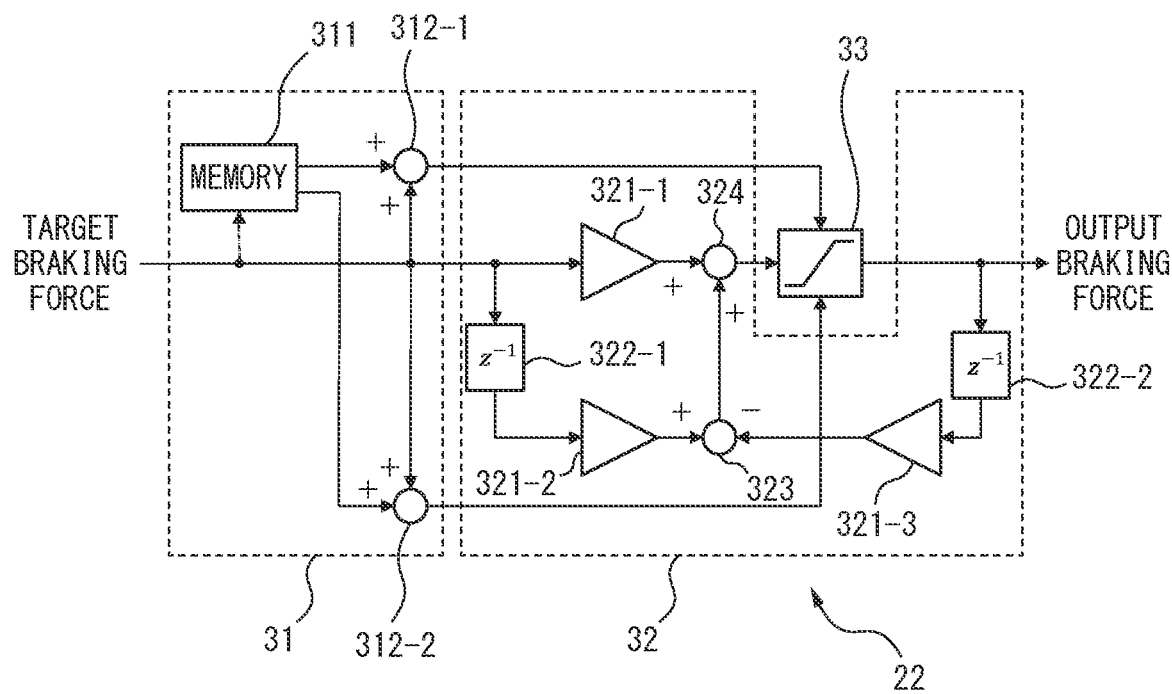
FIG. 3 illustrates the configuration of a filter circuit.

FIG. 3 illustrates the configuration of the filter circuit 22. The filter circuit 22 includes a tolerable-range setting circuit 31, a low-pass filter 32, and a clipping circuit 33. These are, for example, circuits for performing digital computations or may be analog circuits.

The tolerable-range setting circuit 31 is an example of a tolerable-range setting unit. Every time target braking force is inputted from the control circuit 21, the tolerable-range setting circuit 31 sets an upper limit and a lower limit of the tolerable range of the amount of change in the target braking force so as to include the inputted target braking force therein. To this end, the tolerable-range setting circuit 31 includes a memory 311 and two adders 312-1 and 312-2.

The memory 311 includes, for example, a nonvolatile memory circuit and stores an upper limit (e.g., a positive value) and a lower limit (e.g., a negative value) of the tolerable range of the amount of change in the target braking force. The memory 311 outputs the upper limit of the tolerable range to the adder 312-1 and the lower limit thereof to the adder 312-2.

The tolerable range is set, for example, as a range having a width of one division of discrete target braking force plus a predetermined offset, e.g., a range wider than one division of the target braking force and narrower than two divisions of the target braking force. Thus, the filter circuit 22 can appropriately prevent rapid changes in the oil pressure of the brakes 10 caused by overshoot and undershoot in the response of oil pressure of the brakes 10 for the case that the target braking force changes by approximately one division.

The adder 312-1 adds, every time target braking force is inputted from the control circuit 21, the upper limit of the tolerable range inputted from the memory 311 to the inputted target braking force to set the upper limit of the tolerable range of the amount of change in the target braking force. Every time setting the upper limit of the tolerable range of the amount of change in the target braking force, the adder 312-1 outputs this upper limit to the clipping circuit 33.

Similarly, the adder 312-2 adds, every time target braking force is inputted from the control circuit 21, the lower limit of the tolerable range inputted from the memory 311 to the inputted target braking force to set the lower limit of the tolerable range of the amount of change in the target braking force. Every time setting the lower limit of the tolerable range of the amount of change in the target braking force, the adder 312-2 outputs this lower limit to the clipping circuit 33.

The low-pass filter 32, which is an example of a smoothing unit and the smoothing circuit, smoothes inputted target braking force to calculate smoothed required braking force. In the present embodiment, the low-pass filter 32 is an infinite impulse response (IIR) low-pass filter, and includes three amplifiers 321-1 to 321-3, two delayers 322-1 and 322-2, a subtractor 323, and an adder 324.

The amplifier 321-1 amplifies or attenuates, every time target braking force is inputted from the control circuit 21, the inputted target braking force at a first ratio, and outputs the amplified or attenuated target braking force to the adder 324.

The delayer 322-1 delays, every time target braking force is inputted from the control circuit 21, the inputted target braking force by one cycle, and outputs it to the amplifier 321-2.

The amplifier 321-2 amplifies or attenuates, every time the target braking force delayed by one cycle is inputted from the delayer 322-1, the inputted target braking force at a second ratio, and outputs the amplified or attenuated target braking force to the subtractor 323.

The adder 324 adds, every time the amplified or attenuated target braking force is inputted from the amplifier 321-1, the difference between amplified or attenuated one-cycle previous target braking force and amplified or attenuated one-cycle previous output braking force to the inputted target braking force to calculate smoothed required braking force, which is obtained by smoothing the inputted target braking force. This difference is inputted from the subtractor 323. The adder 324 then outputs the smoothed required braking force to the clipping circuit 33.

The delayer 322-2 delays, every time output braking force is inputted from the clipping circuit 33, the inputted output braking force by one cycle, and outputs it to the amplifier 321-3.

The amplifier 321-3 amplifies or attenuates, every time the output braking force delayed by one cycle is inputted from the delayer 322-2, the inputted output braking force at a third ratio, and outputs the amplified or attenuated output braking force to the subtractor 323.

The subtractor 323 subtracts the amplified or attenuated one-cycle previous output braking force, which is inputted from the amplifier 321-3, from the amplified or attenuated one-cycle previous target braking force, which is inputted from the amplifier 321-2, to calculate the difference between this target braking force and this output braking force. The subtractor 323 outputs the calculated difference to the adder 324.

The ratios of amplification or attenuation by the amplifiers included in the filter circuit 22 (i.e., the amplification or attenuation factors) are determined so that the cutoff frequency of the filter circuit 22 may be a frequency (e.g., 0.5 to 1 Hz) less than the frequency of occurrence (e.g., 2 to 3 Hz) of overshoot or undershoot in the response of oil pressure of the brakes 10. For example, the amplification or attenuation factors (the first, second, and third ratios) A0, A1, and B1 of the respective amplifiers 321-1, 321-2 and 321-3 may be determined in accordance with the following expressions.

$$A0 = \frac{T}{2\tau + T}$$
$$A1 = \frac{T}{2\tau + T}$$
$$B1 = \frac{T - 2\tau}{2\tau + T}$$

Constant T denotes a period in which target braking force is inputted into the filter circuit 22, i.e., a sampling period. Constant τ denotes the time constant of the low-pass filter 32 and satisfies τ=2πfc. Frequency fc is the cutoff frequency of the low-pass filter 32.

The clipping circuit 33 is an example of a clipping unit. Every time smoothed required braking force is inputted from the adder 324 of the low-pass filter 32, the clipping circuit 33 compares the smoothed required braking force with the tolerable range set by the tolerable-range setting circuit 31. When the smoothed required braking force is greater than the upper limit of the tolerable range, the clipping circuit 33 outputs the upper limit as output braking force. Similarly, when the smoothed required braking force is less than the lower limit of the predetermined tolerable range, the clipping circuit 33 outputs the lower limit as output braking force. When the smoothed required braking force is within the predetermined tolerable range, i.e., when the smoothed required braking force is not less than the lower limit of the tolerable range nor greater than the upper limit thereof, the clipping circuit 33 outputs the smoothed required braking force itself as output braking force. In this way, when the amount of change in the target braking force is outside the predetermined tolerable range, the clipping circuit 33 outputs output braking force corresponding to the upper or lower limit of the predetermined tolerable range. For this reason, when the amount of change in the target braking force is outside the predetermined tolerable range, the clipping circuit 33 causes the low-pass filter 32 not to be substantially applied to the target braking force inputted from the control circuit 21.

The output braking force outputted from the clipping circuit 33 is inputted into an actuator of the brakes 10 and into the delayer 322-2 of the low-pass filter 32.

Figure 4:
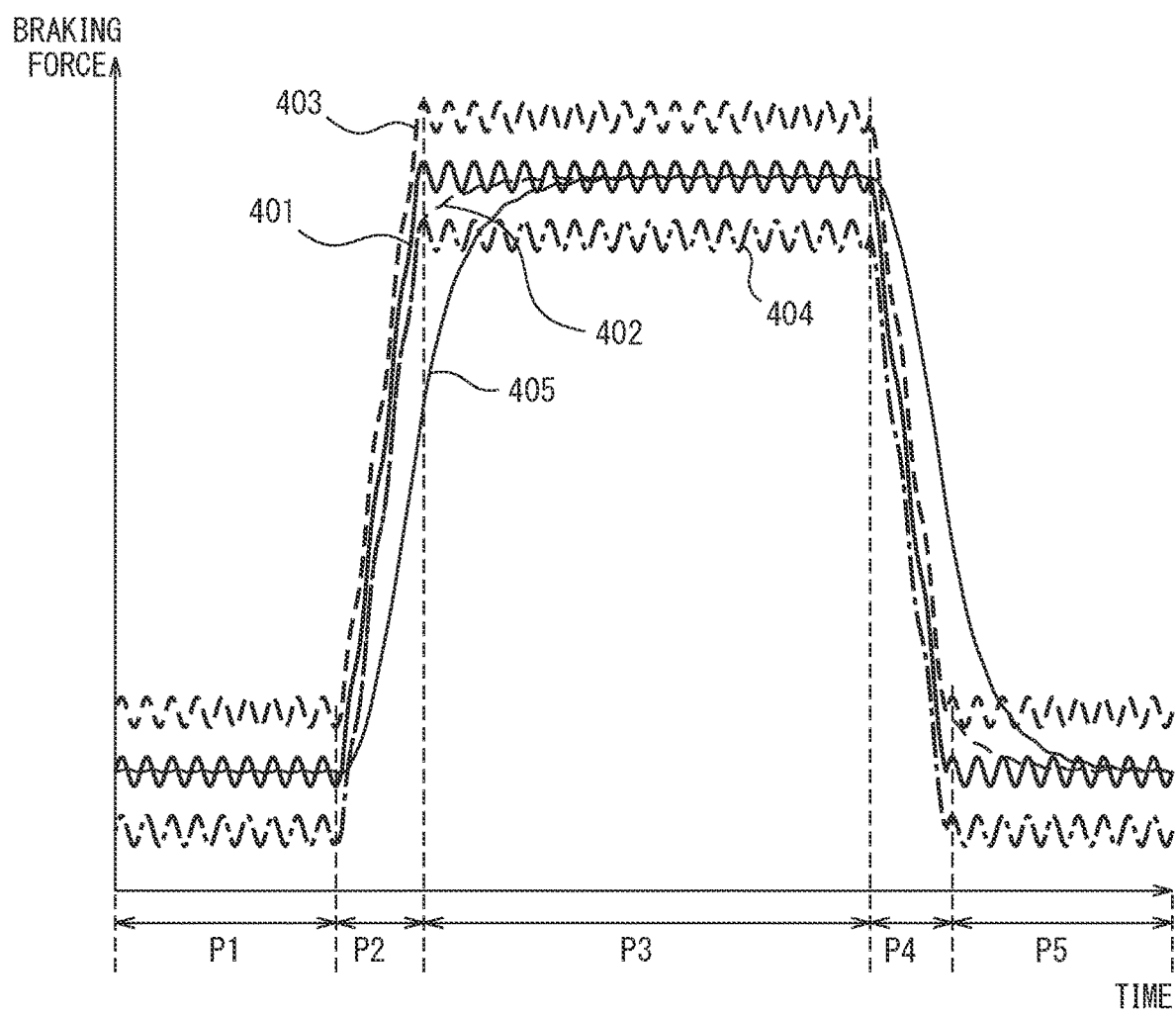
FIG. 4 illustrates an example of time-varying changes in target braking force inputted into the filter circuit and in output braking force outputted from the filter circuit.

FIG. 4 illustrates an example of time-varying changes in target braking force inputted into the filter circuit 22 and in output braking force outputted from the filter circuit 22. In FIG. 4, the abscissa represents time and the ordinate the value of braking force. A waveform 401 represents time-varying changes in target braking force; and a waveform 402 represents time-varying changes in output braking force. A waveform 403 represents time-varying changes in the upper limit of the tolerable range; and a waveform 404 represents time-varying changes in the lower limit of the tolerable range. A waveform 405 represents, as a comparative example, time-varying changes in the smoothed required braking force outputted from the low-pass filter 32 for the case that the target braking force indicated by the waveform 401 is inputted into the low-pass filter 32. The waveforms 401, 403, and 404 suggest that the upper and lower limits of the tolerable range increase or decrease as the target braking force increases or decreases, causing the tolerable range to have a constant width centered at the target braking force. For this reason, in periods P1, P3, and P5 during which the target braking force does not substantially change, the output braking force outputted from the filter circuit 22 is obtained by smoothing the target braking force inputted into the filter circuit 22, as indicated by waveform 402. In period P2 during which the target braking force rapidly increases, the smoothed required braking force outputted from the low-pass filter 32 is less than the lower limit of the tolerable range. As a result, the output braking force outputted from the filter circuit 22 is equal to the lower limit of the tolerable range. This suggests that the output braking force increases without delay as the target braking force increases. In contrast, in period P4 during which the target braking force rapidly decreases, the smoothed required braking force outputted from the low-pass filter 32 is greater than the upper limit of the tolerable range. As a result, the output braking force outputted from the filter circuit 22 is equal to the upper limit of the tolerable range. This suggests that the output braking force decreases without delay as the target braking force decreases. As indicated by waveform 405, in periods P1, P3, and P5 during which the target braking force does not substantially change, the smoothed required braking force outputted from the low-pass filter 32 of the comparative example is obtained by smoothing the target braking force, similarly to the output braking force outputted from the filter circuit 22. However, it is suggested that in the period during which the target braking force rapidly increases or decreases, increase or decrease in the smoothed required braking force of the comparative example is greatly delayed relative to changes in the target braking force. This requires that in the comparative example the time constant of the low-pass filter 32 be shortened, i.e., the cutoff frequency of the low-pass filter 32 be increased in order to prevent changes in the output braking force from being delayed relative to changes in the target braking force. In the comparative example, it is therefore difficult to prevent rapid changes in braking force caused by overshoot or undershoot in the response of oil pressure of the brakes 10 and prevent self-induced vibrations of the oil pressure of the brakes 10 resulting from reflection of these changes in the oil pressure in the feedback control, unlike the case of the filter circuit 22 of the present embodiment.

Figure 5:
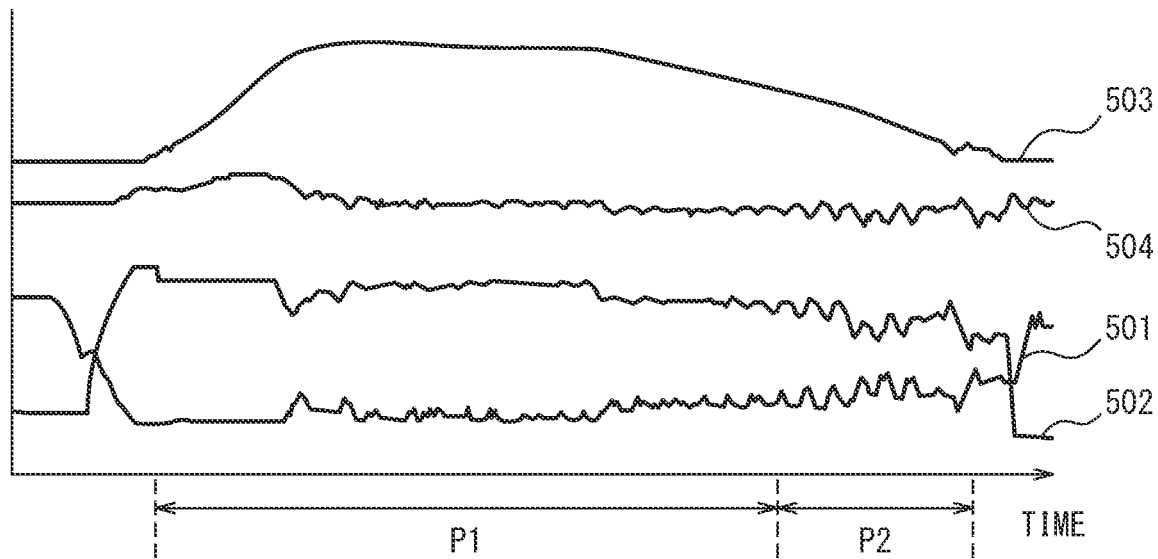
FIG. 5 illustrates an example of time-varying changes in output braking force, in the oil pressure of brakes, and in the speed and acceleration of the vehicle regarding a brake controller of a comparative example.

FIG. 5 illustrates an example of time-varying changes in output braking force, in the oil pressure of the brakes 10, and in the speed and acceleration of the vehicle 100 regarding a brake controller of a comparative example. The brake controller of the comparative example uses a filter circuit including only the low-pass filter 32 of the filter circuit 22 of the present embodiment, and the time constant of the low-pass filter 32 is set so that the delay in changes in the output braking force may be within a tolerable level when the target braking force rapidly changes. In FIG. 5, the abscissa represents time. A waveform 501 represents time-varying changes in the oil pressure of the brakes 10; a waveform 502 represents time-varying changes in the output braking force; a waveform 503 represents time-varying changes in the speed of the vehicle 100; and a waveform 504 represents time-varying changes in the acceleration of the vehicle 100.

According to the brake controller of the comparative example, the waveforms 501 and 502 indicate that periodic changes in the oil pressure having rapid peaks are caused by overshoot or undershoot in the response of oil pressure of the brakes 10 in period P1 during which changes in the output braking force are relatively small. Thus, the waveform 504 indicates that changes in the acceleration (deceleration) of the vehicle 100 are also relatively unsmooth. Additionally, the waveforms in period P2 indicate that reflection of these changes in the oil pressure in the feedback control results in self-induced vibrations in the output braking force and the oil pressure of the brakes 10. This suggests the occurrence of such changes in the acceleration of the vehicle 100 as to make an occupant of the vehicle 100 uncomfortable.

Figure 6:
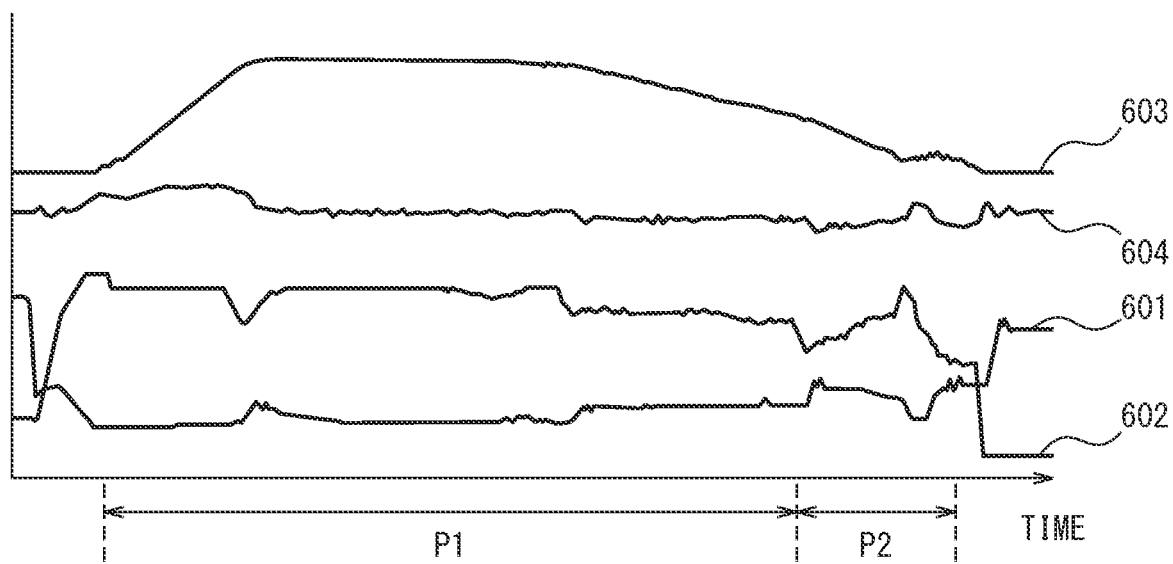
FIG. 6 illustrates an example of time-varying changes in output braking force, in the oil pressure of brakes, and in the speed and acceleration of the vehicle regarding the brake controller of the present embodiment.

FIG. 6 illustrates an example of time-varying changes in output braking force, in the oil pressure of the brakes 10, and in the speed and acceleration of the vehicle 100 regarding the brake controller 1 of the present embodiment. In FIG. 6, the abscissa represents time. A waveform 601 represents time-varying changes in the oil pressure of the brakes 10; a waveform 602 represents time-varying changes in the output braking force; a waveform 603 represents time-varying changes in the speed of the vehicle 100; and a waveform 604 represents time-varying changes in the acceleration of the vehicle 100.

According to the brake controller 1 of the present embodiment, the waveforms 601 and 602 indicate that changes in the oil pressure are prevented from having rapid peaks caused by overshoot or undershoot in the response of oil pressure of the brakes 10 even in period P1 during which changes in the output braking force are relatively small. The waveform 604 also indicates that changes in the acceleration (deceleration) of the vehicle 100 are smoother than those in the comparative example. Additionally, the waveforms indicate that self-induced vibrations do not occur in the output braking force and the oil pressure of the brakes 10 even in period P2. These suggest that the brake controller 1 of the present embodiment prevents such changes in the acceleration of the vehicle 100 as to make an occupant of the vehicle 100 uncomfortable.

Figure 7:
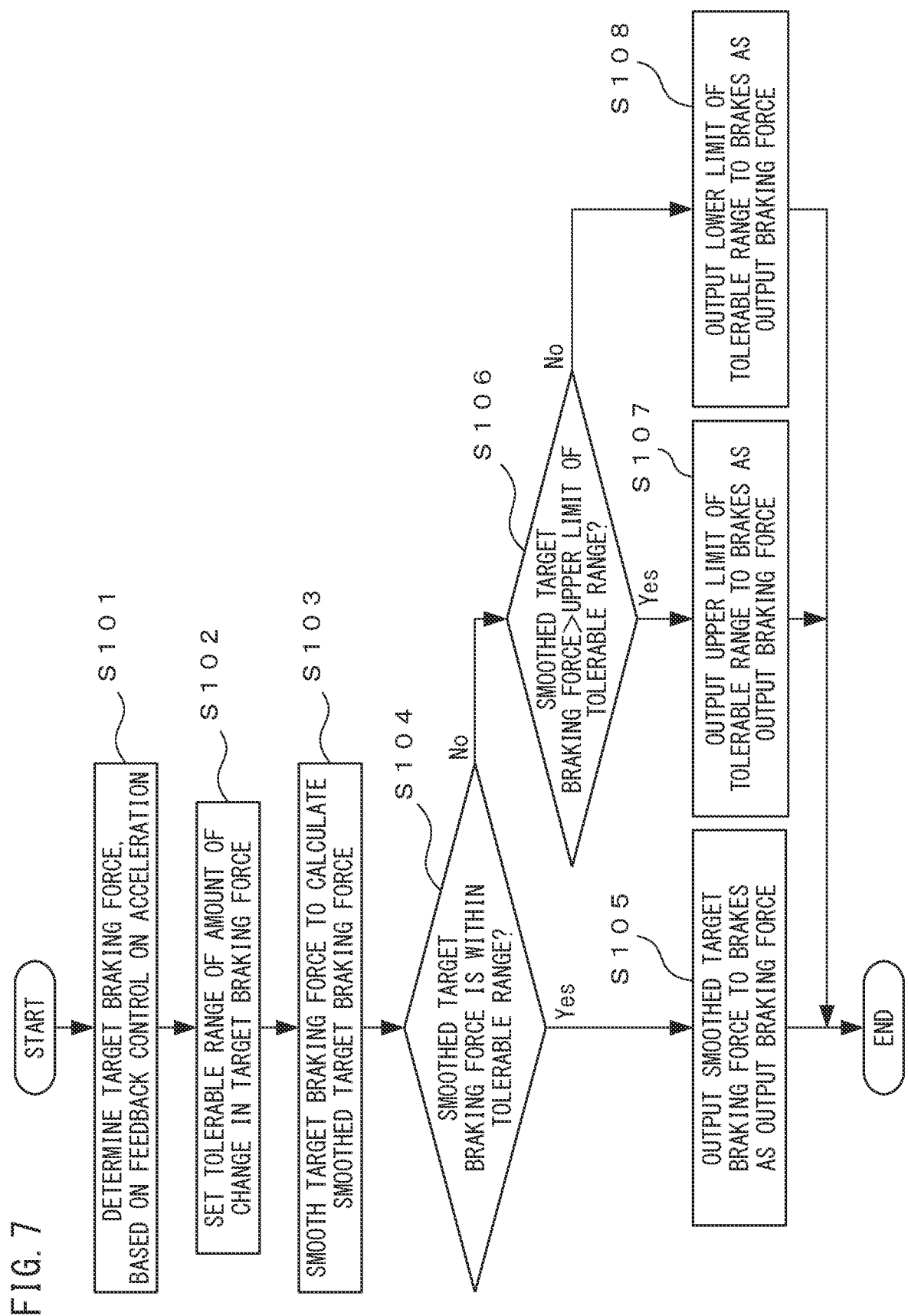
FIG. 7 is an operation flowchart of processing for brake control of the present embodiment.

FIG. 7 is an operation flowchart of processing for brake control of the present embodiment. When automatically parking the vehicle 100, the ECU 1 may perform the processing for brake control every predetermined period in accordance with the following operation flowchart.

The control circuit 21 determines target braking force required of the brakes 10, based on feedback control on the acceleration of the vehicle 100, and outputs the determined target braking force to the filter circuit 22 (step S101).

The tolerable-range setting circuit 31 of the filter circuit 22 sets a tolerable range of the amount of change in the inputted target braking force (step S102). The low-pass filter 32 of the filter circuit 22 smoothes the inputted target braking force to calculate smoothed target braking force (step S103).

The clipping circuit 33 of the filter circuit 22 determines whether the smoothed target braking force is within the tolerable range set by the tolerable-range setting circuit 31 (step S104). When the smoothed target braking force is within the tolerable range (Yes in step S104), the clipping circuit 33 outputs the smoothed target braking force itself to the actuator of the brakes 10 as output braking force (step S105).

When the smoothed target braking force is outside the tolerable range (No in step S104), the clipping circuit 33 determines whether the smoothed target braking force is greater than the upper limit of the tolerable range (step S106). When the smoothed target braking force is greater than the upper limit of the tolerable range (Yes in step S106), the clipping circuit 33 outputs the upper limit to the actuator of the brakes 10 as output braking force (step S107). When the smoothed target braking force is less than the lower limit of the tolerable range (No in step S106), the clipping circuit 33 outputs the lower limit to the actuator of the brakes 10 as output braking force (step S108). After step S105, S107, or S108, the ECU 1 terminates the processing for brake control.

As has been described above, the brake controller performs feedback control on the acceleration (deceleration) of a vehicle to park the vehicle. To this end, the brake controller switches between application and non-application of the low-pass filter, depending on the amount of change in the target braking force of the brake device. More specifically, when the amount of change in the target braking force is relatively large, the brake controller prevents changes in braking force actually generated by the brake device from being delayed relative to changes in the target braking force. When the amount of change in the target braking force is relatively small, the brake controller smoothes changes in braking force actually generated by the brake device so as not to make the driver uncomfortable. In particular, the fact that the brake controller applies the low-pass filter only when the amount of change in the target braking force is relatively small allows the time constant of the low-pass filter to be large. As a result, the brake controller can prevent rapid changes in braking force and self-induced vibrations thereof caused by overshoot or undershoot in the response of oil pressure of the brake device to minute changes in the target braking force. For this reason, the brake controller can control the brake device of the vehicle so as not to make an occupant thereof uncomfortable when braking the vehicle.

The range of variation in target braking force is not necessarily fixed, and may vary depending on the magnitude of the target braking force. For example, the greater the target braking force, the wider the range of variation may be.

Therefore, according to a modified example, the memory 311 of the tolerable-range setting circuit 31 of the filter circuit 22 may store a table indicating a correspondence between the values of target braking force and the upper and lower limits of the tolerable range of the target braking force. For example, this table may indicate the upper and lower limits corresponding to the values of target braking force so that the greater the value of target braking force, the greater the absolute values of the corresponding upper and lower limits, i.e., the wider the tolerable range. In this case, the tolerable-range setting circuit 31 may further include a processor that refers to the table stored in the memory 311, every time target braking force is inputted from the control circuit 21, to identify the upper and lower limits corresponding to the inputted target braking force, and outputs the identified upper and lower limits to the adders 312-1 and 312-2, respectively. According to this modified example, the filter circuit 22 can set the tolerable range more appropriately, depending on the magnitude of the target braking force, allowing for switching between application and non-application of smoothing of the target braking force more appropriately.

According to another modified example, the filter circuit may be configured to directly output, when the amount of change in the inputted target braking force is outside the predetermined tolerable range, the inputted target braking force itself to the brakes 10 as output braking force.

Figure 8:
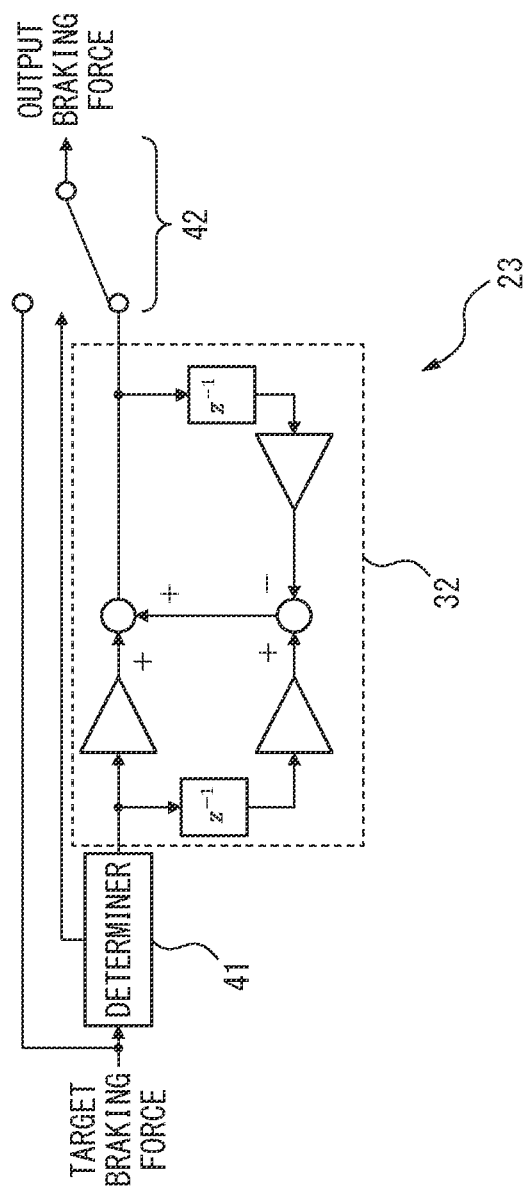
FIG. 8 illustrates the configuration of a filter circuit of a modified example.

FIG. 8 illustrates the configuration of a filter circuit 23 of this modified example. The filter circuit 23 includes a determiner 41, a switch 42, and a low-pass filter 32. These are, for example, circuits for performing digital computations or may be analog circuits. In FIG. 8, the components of the filter circuit 23 are assigned the same reference numerals as the corresponding components of the filter circuit 22 illustrated in FIG. 3.

The filter circuit 23 of this modified example includes the determiner 41 and the switch 42 instead of the tolerable-range setting circuit 31 and the clipping circuit 33, and differs from the filter circuit 22 of the embodiment in this respect. The following describes this difference and matters relevant thereto. Regarding details of the other components of the filter circuit 23, see the description of the corresponding components in the embodiment.

The determiner 41, which is an example of a determining unit and the determining circuit, determines whether the amount of change in target braking force, which is calculated as the difference between the latest target braking force and the target braking force inputted one cycle previously, i.e., the one inputted immediately previous thereto, is within a predetermined tolerable range. When the amount of change is within the tolerable range, the determiner 41 controls the switch 42 so that smoothed required braking force may be outputted from the low-pass filter 32 to the actuator of the brakes 10 as output braking force. When the amount of change is outside the tolerable range, the determiner 41 controls the switch 42 so that the latest target braking force may be directly outputted to the actuator of the brakes 10 as output braking force.

To perform the this processing, the determiner 41 includes, for example, a memory circuit, a subtraction circuit (subtractor), and a comparison circuit (comparator). The memory circuit retains inputted target braking force only for one cycle. The subtraction circuit calculates the difference between the one-cycle previous target braking force retained in the memory circuit and the latest target braking force as the amount of change. The comparison circuit compares the amount of change calculated by the subtractor with the tolerable range. When the amount of change is within the tolerable range, the comparison circuit outputs a control signal to the switch 42 such that the smoothed required braking force may be outputted from the low-pass filter 32 to the actuator of the brakes 10. When the amount of change is outside the tolerable range, the comparison circuit outputs a control signal to the switch 42 such that the target braking force inputted into the filter circuit 23 may be directly outputted to the actuator of the brakes 10.

The switch 42, which is an example of a switching unit, is a two input, one output switch. The switch 42 is disposed between the low-pass filter 32 and the brakes 10. The switch 42 outputs the smoothed required braking force outputted from the low-pass filter 32 or the target braking force inputted into the filter circuit 23 to the actuator of the brakes 10 as output braking force, in accordance with the control signal from the determiner 41. More specifically, when the control signal from the determiner 41 indicates instructions that the smoothed required braking force outputted from the low-pass filter 32 should be outputted to the actuator of the brakes 10, the switch 42 connects the brakes 10 to the low-pass filter 32, so that the smoothed required braking force may be outputted to the actuator of the brakes 10. When the control signal from the determiner 41 indicates instructions that the target braking force inputted into the filter circuit 23 should be directly outputted to the actuator of the brakes 10, the switch 42 connects the brakes 10 to a signal line connecting the control circuit 21 and the filter circuit 23, so that the target braking force may be directly outputted to the actuator of the brakes 10.

In this way, the brake controller including the filter circuit of this modified example also switches between application and non-application of the low-pass filter, depending on the amount of change in the target braking force of the brake device, similarly to the brake controller of the embodiment. More specifically, when the amount of change in the target braking force is relatively large, the brake controller prevents changes in braking force actually generated by the brake device from being delayed relative to changes in the target braking force. When the amount of change in the target braking force is relatively small, the brake controller smoothes changes in braking force actually generated by the brake device so as not to make the driver uncomfortable.

As described above, those skilled in the art may make various modifications according to embodiments within the scope of the present invention.

What is claimed is:

1. A brake controller for controlling a brake device of a vehicle, the brake controller comprising:
   a control circuit that calculates target braking force every predetermined period, in accordance with feedback control on at least acceleration or speed of the vehicle steered for parking; and
   a filter circuit that outputs, when the amount of change in the target braking force over time is within a predetermined tolerable range, output braking force to the brake device, the output braking force being obtained by applying a low-pass filter having a predetermined time constant to the target braking force,
   on the other hand, when the amount of change is outside the predetermined tolerable range, outputs, without applying the low-pass filter to the target braking force, the target braking force to the brake device as the output braking force or outputs, to the brake device, the output braking force calculated by correcting smoothed target braking force so that a difference between the smoothed target braking force and the target braking force is within the predetermined tolerable range, the smoothed target braking force being obtained by applying the low-pass filter to the target braking force.

2. The brake controller according to claim 1, wherein the filter circuit comprises
   a tolerable-range setting circuit that sets, every time the target braking force is inputted, an upper limit and a lower limit of the tolerable range so as to include the inputted target braking force therein;
   a smoothing circuit that applies the low-pass filter to the inputted target braking force to output the smoothed target braking force; and
   a clipping circuit that outputs, to the brake device as the output braking force, the smoothed target braking force when the smoothed target braking force is within the tolerable range, the upper limit when the smoothed target braking force is greater than the upper limit, and the lower limit when the smoothed target braking force is less than the lower limit.

3. The brake controller according to claim 2, wherein the greater the inputted target braking force, the more the tolerable-range setting circuit widens the tolerable range.

4. The brake controller according to claim 1, wherein the filter circuit comprises
   a smoothing circuit that applies the low-pass filter to the target braking force inputted into the filter circuit to output the smoothed target braking force;
   a switch for outputting the smoothed target braking force or the target braking force to the brake device as the output braking force; and
   a determining circuit that calculates, as the amount of change, a difference between the inputted target braking force and target braking force inputted immediately previous thereto and causes the switch to output, to the brake device as the output braking force, the smoothed target braking force when the amount of change is within the predetermined tolerable range and the target braking force when the amount of change is outside the predetermined tolerable range.

5. A method for controlling a brake device of a vehicle, comprising:
- calculating target braking force every predetermined period, in accordance with feedback control on at least acceleration or speed of the vehicle steered for parking;
- outputting, when the amount of change in the target braking force over time is within a predetermined tolerable range, output braking force to the brake device, the output braking force being obtained by applying a low-pass filter having a predetermined time constant to the target braking force; and
- outputting, when the amount of change is outside the predetermined tolerable range, without applying the low-pass filter to the target braking force, the target braking force to the brake device as the output braking force or outputting, to the brake device, the output braking force calculated by correcting smoothed target braking force so that a difference between the smoothed target braking force and the target braking force is within the predetermined tolerable range, the smoothed target braking force being obtained by applying the low-pass filter to the target braking force.

* * * * *